(12) United States Patent
Herzog et al.

(10) Patent No.: US 7,373,283 B2
(45) Date of Patent: May 13, 2008

(54) MONITORING AND FAULT DETECTION SYSTEM AND METHOD USING IMPROVED EMPIRICAL MODEL FOR RANGE EXTREMA

(75) Inventors: James P. Herzog, Downers Grove, IL (US); Stephan W. Wegerich, Glendale Heights, IL (US)

(73) Assignee: Smartsignal Corporation, Lisle, IL (US)

( * ) Notice: Subject to any disclaimer, the term of this patent is extended or adjusted under 35 U.S.C. 154(b) by 994 days.

(21) Appl. No.: 09/791,046

(22) Filed: Feb. 22, 2001

(65) Prior Publication Data

US 2002/0152056 A1 Oct. 17, 2002

(51) Int. Cl.
*G06F 17/10* (2006.01)
(52) U.S. Cl. .......................................................... 703/2
(58) Field of Classification Search .................... 703/2; 706/26; 700/30, 31, 47
See application file for complete search history.

(56) References Cited

U.S. PATENT DOCUMENTS

| 4,937,763 | A | | 6/1990 | Mott |
| 5,764,509 | A | | 6/1998 | Gross et al. |
| 5,987,399 | A | * | 11/1999 | Wegerich et al. ........... 702/183 |

FOREIGN PATENT DOCUMENTS

WO PCT/US00/11488 11/2000

OTHER PUBLICATIONS

Black, Christopher L.; Uhrig, Robert E.; Hines, J. Wesley; "System Modeling and Instrument Calibration Verification with a Nonlinear State Estimation Technique", Maintenance and Reliability Conference Proceedings, May 12-14, 1998.*

Jain, A. K.; Murty, M. N.; Flynn, P. J.; "Data Clustering: A Review", ACM Computing Surveys, vol. 31, No. 3, Sep. 1999.*

Chen Chi-hau; "Statistical Pattern Recognition", 1973, Spartan Books.*

Black et al., System Modeling and Instrument Calibration Verification with a Nonlinear State Estimation Technique, Maintenance And Reliability Conference Proceedings, May 12-14, 1998, pp. 58.01-58.15, vol. 2 of 2, MARCON 98, Knoxville, Tennessee.

"ACM Workstation User's Guide", Version 2001, Performance Consulting Services, Incorporated, Copyright 1994-2001.

"ModelWare™ User's Manual", Teranet IA Incorporated, Copyright 1992.

J. E. Mott, R. W. King, L. R. Monson, D. L. Olson, and J. D. Staffon, "A Universal, Fault-Tolerant, Non-Linear Analytic Network for Modeling and Fault Detection," Power Plant Dynamics, Control, and Testing Symposium, 1992.

\* cited by examiner

*Primary Examiner*—Paul Rodriguez
*Assistant Examiner*—Russ Guill
(74) *Attorney, Agent, or Firm*—Fitch, Even, Tabin & Flannery

(57) ABSTRACT

A method and apparatus for improved monitoring the operational state of instrumented systems is provided. An empirical model characterizes normal or desirable operation of the system, and real-time observations are provided to the model to generate estimates of expected sensor values. Comparison of the estimates with the real-time observations provides advanced warning of discrepancies in the operational state of the instrumented system. The invention provides for incipient failure detection, sensor failure detection and incipient process upset. An improved similarity operator provides for estimates that are not impaired by real-time observations at or beyond the limits of modeled data. The similarity operator comprises a difference function added to a constant, and the result is inverted.

21 Claims, 7 Drawing Sheets

MONITORING AND FAULT DETECTION SYSTEM AND METHOD USING IMPROVED EMPIRICAL MODEL FOR RANGE EXTREMA

FIELD OF THE INVENTION

The present invention relates to the monitoring of physical processes for the early detection of impending equipment failure or process disturbance and on-line, continuous validation of sensor operation. More particularly, the present invention relates to systems and methods for the detection of impending equipment failure through the use of an improved similarity operator and modeling technique.

BACKGROUND OF THE INVENTION

A variety of new and advanced techniques have emerged in industrial process control, machine control, system surveillance, and condition based monitoring to address drawbacks of traditional sensor-threshold-based control and alarms. The traditional techniques did little more than provide responses to gross changes in individual metrics of a process or machine, often failing to provide adequate warning to prevent unexpected shutdowns, equipment damage, loss of product quality or catastrophic safety hazards.

According to one branch of the new techniques, empirical models of the monitored process or machine are used in both failure detection and control. Such models effectively leverage an aggregate view of surveillance sensor data to achieve much earlier incipient failure detection and finer process control. By modeling the many sensors on a process or machine simultaneously and in view of one another, the surveillance system can provide more information about how each sensor (and its measured parameter) ought to behave. Additionally, these approaches have the advantage that no additional instrumentation is typically needed, and sensors in place on the process or machine can be used.

An example of such an empirical surveillance system is described in U.S. Pat. No. 5,764,509 to Gross et al., the teachings of which are incorporated herein by reference in its entirety. In Gross, there is described an empirical model using a similarity operator against a reference library of known states of the monitored process, and an estimation engine for generating estimates of current process states based on the similarity operation, coupled with a sensitive statistical hypothesis test to determine if the current process state is a normal or abnormal state. Other empirical model-based monitoring systems known in the art employ neural networks to model the process or machine being monitored.

The role of the similarity operator in the above empirical surveillance system is to determine a metric of the similarity of a current set of sensor readings to any of the snapshots of sensor readings contained in the reference library. The similarity metric thusly rendered is used to generate an estimate of what the sensor readings ought to be, from a weighted composite of the reference library snapshots. The estimate can then be compared to the current readings for monitoring differences indicating incipient process upset, sensor failure or the like.

A variety of similarity operators are known, and generally render a metric between zero (signifying that the operators are not similar) and one (where the operators are identical) for comparisons of sensor values. Rendering a value in this range is useful for subsequently computing an estimate of the expected state of the monitored machine or process as a composite of known states. For example, a BART similarity operator is disclosed in U.S. Pat. No. 5,987,399 to Wegerich et al., the teachings of which are incorporated herein by reference in its entirety. Many such operators provide a discontinuous estimate for sensor values when the current snapshot presents a sensor reading that is outside the range of values in the reference library for that sensor. According to some implementations, when such circumstances are encountered, the similarity is not so much computed as simply set to zero. However, this can disregard important information about the relative offset of the current actual sensor reading compared to those in the reference set. What is needed, therefore, is an improved similarity operator that can accommodate sensor readings outside of the modeled range, and provide meaningful similarity values and sensor estimates for these circumstances. Furthermore, such a similarity operator should generally provide for accurate and meaningful results.

SUMMARY OF THE INVENTION

The present invention provides an improved system and method for monitoring a machine, process or other piece of equipment. More specifically, an empirical model is developed of the process or machine to be monitored, and in real-time sensor data from the monitored process or machine is compared to estimates of such data from the model. The results of the comparison are statistically tested with an ultra sensitive difference test that indicates alerts on a sensor-by-sensor basis, thereby providing early warning of process upsets, sensor failures, and drift from optimal operation, long before these would be noticed by conventional monitoring techniques. According to the invention, an improved similarity operator is used in generating the estimates.

The improved similarity operator accommodates sensor values outside a modeled range by a two-step calculation. In a first step, a function is computed relative to two sensor values being compared, irrespective of the limits of the expected range of such sensor data. However, the function also scales relative to the magnitude of the expected range of the sensor data. In a second step, this function is used to compute the similarity value. More specifically, the similarity value is proportional to the inverse of the computed function plus one. The similarity is thus never a negative number, and is continuous for all sensor inputs.

In a process or machine that is instrumented with sensors, sensor data is collected for all regimes of expected later operation of the same or similar processes or machines. This collected data forms a history from which the present invention may "learn," or interpolate, the desired, or "normal," operation of the process or machine, using training routines that distill it to a representative set of sensor data (i.e., a reference set). Using this representative set of sensor data, the present invention is then able to monitor the process or machine in real-time operation (or in batch mode, if preferred), and generate estimates of expected values of the sensors in response to current actual sensor values. Sensor estimates are generated by comparing the current values of the sensors (the current "observation" or "snapshot") to the historic snapshots comprising the reference set, using the improved similarity operator. The estimates are formed by contributions from the reference set snapshots on the basis of the similarities.

To this end, it is an object of the present invention to provide for a method for calculating a similarity value, even when an input sensor reading lies outside the range of modeled data. Generally speaking, when a current snapshot of values for sensors is received, it is compared to the historic snapshots in the reference set. For each pair of corresponding sensor values from the current snapshot and a reference set snapshot, a function is calculated. Each such function value is used to compute a similarity for the pair, which has the function value in the denominator. The sensor value similarities are averaged for the comparison of the current snapshot to the particular reference set snapshot to provide an overall snapshot similarity.

It is a further object of the present invention to provide for a system for detecting a difference in a signal. An estimated snapshot comprises a linear combination of reference set snapshots weighted by similarity to the current snapshot. The estimate snapshot is compared to the current snapshot, and differences are detected as potential differences of the current process or machine with what is expected.

It is a further object of the present invention to provide for an apparatus for detecting a difference in the signal. The apparatus includes a sensor for receiving a sampled sequence of current input values. Additionally, the apparatus includes a memory location for storing a plurality of reference values. Finally, the apparatus includes a processor disposed to calculate a similarity value as described above in response to receiving a current input value from the sensor.

Finally, it is a further object of the present invention to provide for a method for empirically modeling multiple parameters of a system selected from a process, a machine and a biological system. A reference library of snapshots of time-related values of the parameters is provided. These time-related values of the parameters represent the operation of the system. A monitored snapshot of values of at least some of the parameters is also provided. A difference function of values of at least some of the parameters is then computed for corresponding parameters of the monitored snapshot in the reference library. Finally, similarities are computed for at least some of the parameters of corresponding parameters. The similarities are the inverse of a constant plus the value of a difference function.

BRIEF DESCRIPTION OF THE DRAWINGS

Preferably, the present invention is directed to the employment of an improved similarity operator within an empirical modeling engine for use in generating estimates of sensor values for a monitored process or machine based on input of the actual sensor values. Advantageously, the similarity operation carried out according to the present invention provides continuity of the sensor estimates generated when the model is presented with new input values for sensors which lie outside the ranges on which the model was trained.

The novel features believed to be characteristic of the present invention are set forth in the appended claims. The present invention itself, however, as well as the preferred mode of use, and further objectives and advantages thereof, are best understood by reference to the following detailed description of the embodiments in conjunction with the accompanying drawings, wherein:

DETAILED DESCRIPTION OF A PRESENTLY-PREFERRED EMBODIMENT

Figure 1:
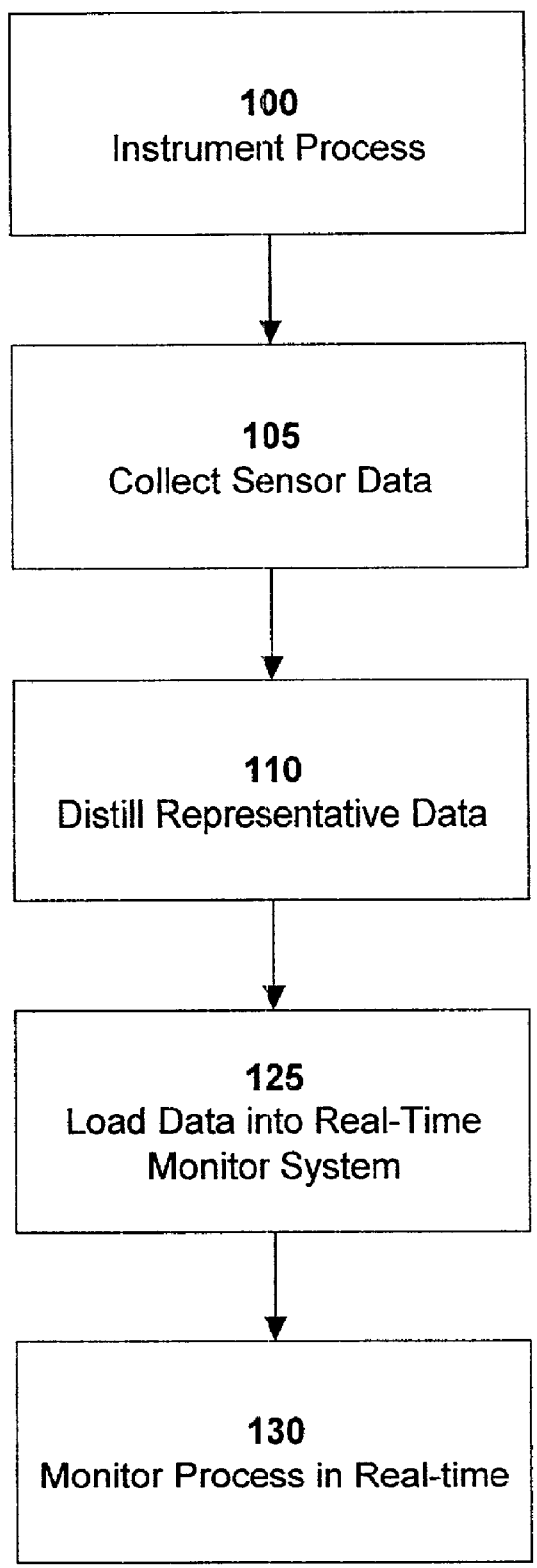
FIG. 1 illustrates a method for setting up real-time monitoring for a process or machine, in accordance with the present invention.

According to the present invention, a process or machine can be monitored for process upsets, sensor failures and other impending faults, using an empirical model of the process or machine generated from sensor data gathered while the process or machine is operating in a satisfactory state. The empirical model employs the improved similarity operator of the present invention, in conjunction with a training set or reference library distilled from the gathered normal operating data, and generates an estimate for the sensor values for the process or machine in response to input of the current actual sensor data from the process or machine as it operates. These estimates are compared to the actual sensor data in a sensitive statistical test, which provides indications of impending faults accordingly.

For a given set of contemporaneous sensor data from the monitored process or machine running in real-time, the estimates for the sensors can be generated according to:

$$\vec{Y}_{estimated} = \vec{D} \cdot \vec{W} \quad (1)$$

where the vector $Y_{estimated}$, corresponding to estimated values for the sensors, is equal to the contributions from each of the snapshots of contemporaneous sensor values arranged to comprise matrix D (the reference library or reference set). These contributions are determined by weight vector W. The multiplication operation is the standard matrix/vector multiplication operator. The vector Y has as many elements as there are sensors of interest in the monitored process or machine. W has as many elements as there are reference snapshots in D. W is determined by:

$$\vec{W} = \frac{\hat{W}}{\left(\sum_{j=1}^{N} \hat{W}(j)\right)} \quad (2)$$

$$\hat{\vec{W}} = (\overline{D}^T \otimes \overline{D})^{-1} \cdot (\overline{D}^T \otimes \vec{Y}_{in}) \quad (3)$$

where the T superscript denotes the transpose of a matrix (i.e., in which the rows of the matrix become columns), and $Y_{in}$ is the current snapshot of actual, real-time sensor data. The improved similarity operator of the present invention is symbolized in Equation 3, above, as the circle with the "X" disposed therein. Moreover, D is again the reference library as a matrix, and $D^T$ represents the standard transpose of that matrix. $Y_{in}$ is the real-time or actual sensor values from the underlying system, and therefore is a vector snapshot.

As stated above, the symbol ⊗ represents the "similarity" operator, and could potentially be chosen from a variety of operators. In the context of the invention, this symbol should not to be confused with the normal meaning of designation of ⓧ, which is something else. In other words, for purposes of the present invention, the meaning of ⓧ is that of a "similarity" operation.

The similarity operator, ⓧ, works much as regular matrix multiplication operations, on a row-to-column basis. The similarity operation yields a scalar value for each pair of corresponding $n^{th}$ elements of a row and a column, and an overall similarity value for the comparison of the row to the column as a whole. This is performed over all row-to-column combinations for two matrices (as in the similarity operation on D and its transpose above).

Turning to FIG. 1, a flowchart generally shows a methodology for implementing the present invention. As stated above, the present invention may be used on a process, machine, system or other piece of equipment, whether mechanical, electrical or biological. In Step 100 of FIG. 1, a process or machine to be monitored (in this Figure, a process) is fully instrumented with sufficient sensors to measure various parameters of interest. In most circumstances, the process will already be instrumented with sensors for parameters that are already being used for control. As shown in Step 105, sensor data is collected as the process is operated through all possible ranges of expected operation. Data collection can occur in batches over a period of time of normal operation, when the process is known to be in desired states of operation. Alternatively, the process can be ramped through various operational ranges specifically to generate and gather the data. In any case, at the end of some period of data collection, enough data has been collected on the process to sufficiently characterize the ranges of the process. As shown in Step 110, one of several "training" methods can be used to distill the sensor data collected in Step 105 into a subset (the reference library, matrix D) sufficient to represent the operational ranges and correlations between the sensors over those ranges. These methods are discussed in greater detail below. As shown in Step 125, the distilled representative sensor data (or a transformation of that data), is loaded into a processor memory in preparation for real-time monitoring. In Step 130, the monitoring system is turned on to provide real-time monitoring of the process using the empirical model afforded by the representative sensor data stored in memory. Live sensor data feeds into the monitoring system and the processor generates estimates in response thereto with reference to the reference library of distilled data, and the estimates serve as a basis for comparison of the live data for detection of incipient process upset of sensor failure.

In collecting data to characterize the process or machine to be monitored, the instrumented process or machine can be identical to or merely substantially similar to the process or machine for which monitoring will be performed. For example, in the case of an engine, a prototype engine can be fully instrumented in a laboratory bench setting with sensors for all parameters. The prototype engine is then operated through a variety of operational ranges, and sensor data for all the sensors is recorded, preferably as digitized and time-stamped values by means of digital computers attached to and in communication with the sensor outputs. Using a computer processor running the software of the present invention, the collected sensor data is then distilled down to a subset of sensor data that represents the operational ranges for which data was collected. Where the goal is to mass-produce the engine with on-line fault monitoring, the distilled representative data from the prototype may be provided in a memory incorporated onboard a processor module on the engine.

The amount of historic data that must be collected to provide for the representative training set is, of course, contingent on the specific application and the variety of operational modes and ranges that will be encountered in normal monitored operation, but in any case will usually represent much less time and effort than is required to study the system through all its ranges to derive a first-principles model of the system. Importantly, the data collected should include both sides of any hysteresis present in the operational modes.

Figure 2:
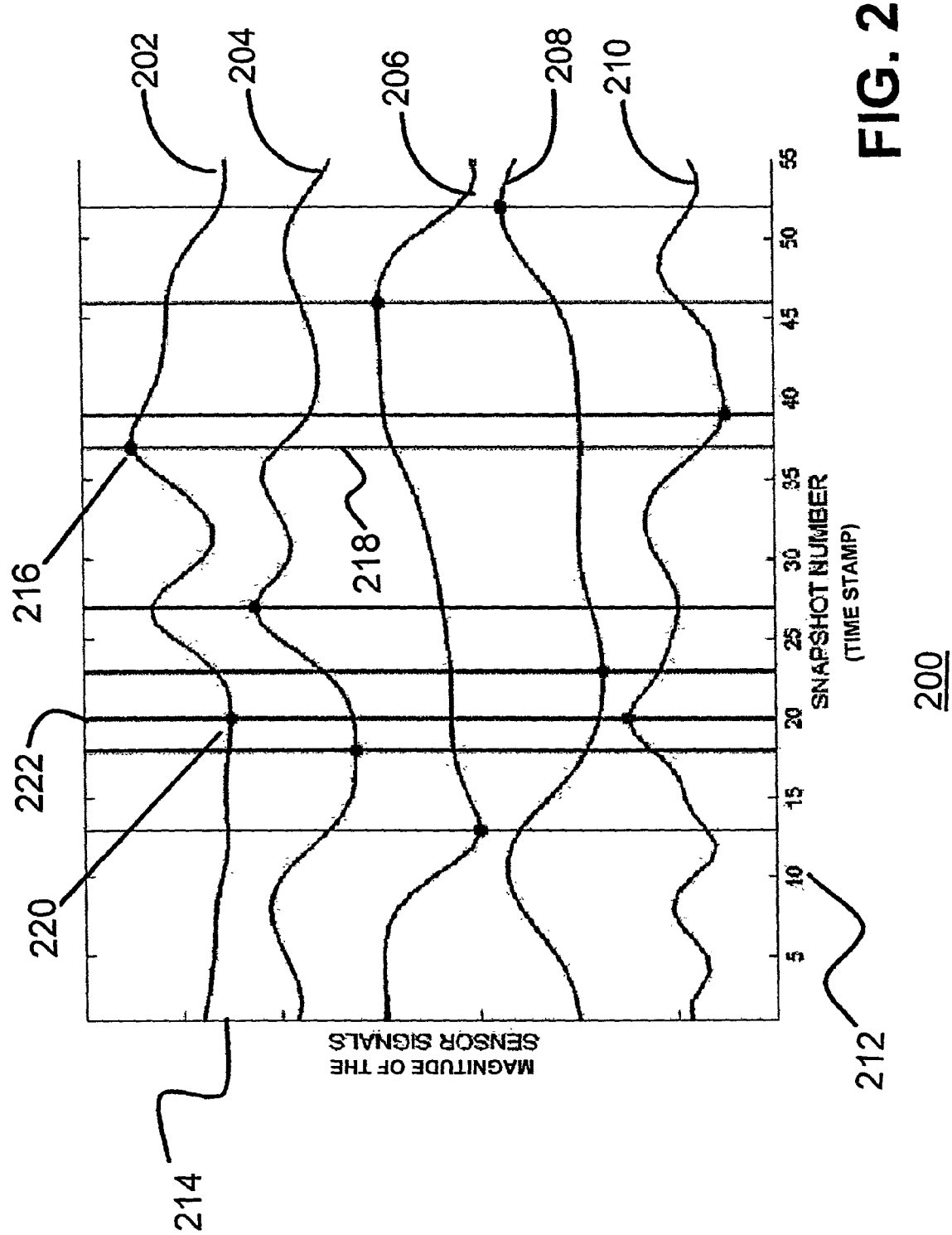
FIG. 2 illustrates a graph illustrating a method for creating a representative "training" data set from collected sensor data, for use with the present invention.

Turning to FIG. 2, a method is graphically depicted for distilling according to Step 105 sensor data collected under normal operation according to Step 110 of FIG. 1 to create a representative training data set, also called a reference library herein. Five sensor signals 202, 204, 206, 208 and 210 are shown for a process or machine. The abscissa axis 215 is the sample number or time stamp of the collected sensor data, where the data is digitally sampled and the sensor data is temporally correlated. The ordinate axis 220 represents the relative magnitude of each sensor reading over the samples or "snapshots". Each snapshot represents a vector of five elements in this example, one reading for each sensor in that snapshot. Of all the sensor data collected (all the snapshots), according to this training method, only those five-element snapshots are included in the representative training set that contain either a global minimum or a global maximum value for any given sensor. Therefore, for sensor 202, the global maximum 225 justifies the inclusion of the five sensor values at the intersections of line 230 with each sensor signal, including global maximum 225, in the representative training set, as a vector of five elements. Similarly, for sensor 202, the global minimum 235 justifies the inclusion of the five sensor values at the intersections of line 240 with each sensor signal.

Figure 3:
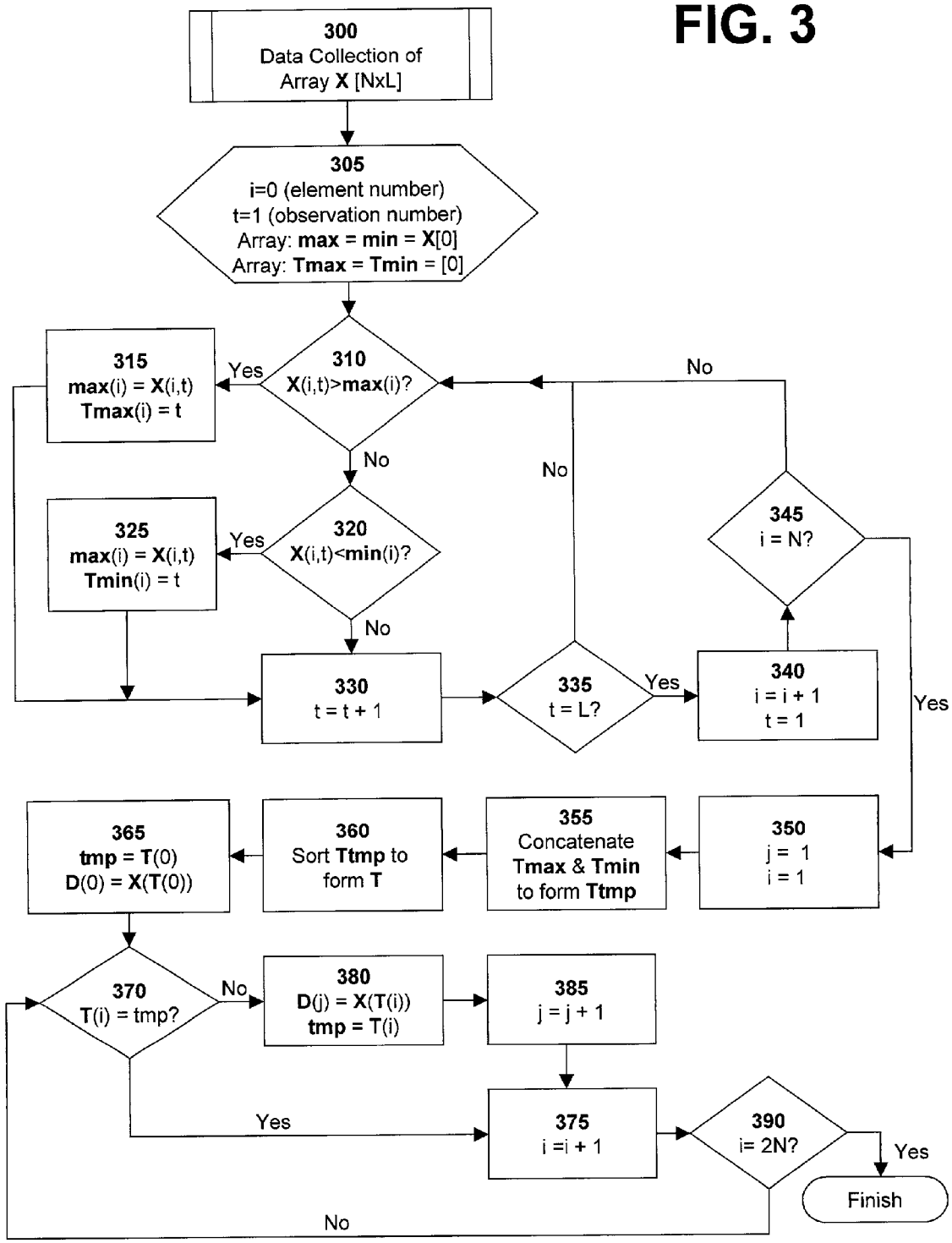
FIG. 3 illustrates a flowchart for creating a representative "training" data set from collected sensor data for use in the present invention.

Selection of representative data is further depicted in the flow chart of FIG. 3. Data collected in Step 300 (relating to Step 110 of FIG. 1) has N sensors and L observations or snapshots or temporally related sets of sensor data that comprise Array X of N rows and L columns. In Step 305, counter i (representing the element or sensor number) is initialized to zero, and observation or snapshot counter, t, is initialized to one. Moreover, Arrays max and min (containing maximum and minimum values, respectively, across the collected data for each sensor) are initialized to be vectors each of N elements which are set equal to the first column of X. Additional Arrays Tmax and Tmin (holding the observation number of the maximum and minimum value seen in the collected data for each sensor) are initialized to be vectors each of N elements, all having initial values of zero.

In Step 310, if the sensor value of sensor i at snapshot t in X is greater than the maximum yet seen for that sensor in the collected data, max(i) is updated and set to equal the sensor value. Additionally, Tmax(i) stores the number t of the observation, as shown in Step 315. If the sensor value is not greater than the maximum, a similar test is done for the minimum for that sensor, as illustrated in Steps 320 and 325. The observation counter t is then incremented in Step 330. As shown in Step 335, if all the observations have been reviewed for a given sensor (i.e., when the observation counter t equals the number of snapshots, L) then the observation counter t is reset to one and the counter i is incremented, as shown in Step 340. At this point, the program continues to Step 310 to find the maximum and minimum for the next sensor. Once the last sensor has been finished, at which point i=n, as shown in Step 345, then any redundancies are removed and an array D is created from a subset of vectors from Array X. This creation process is discussed below.

In Step 350, counters i and j are both initialized to one. As illustrated by Step 355, arrays Tmax and Tmin are concatenated to form a single vector Ttmp. Preferably, Ttmp has 2N elements, sorted into ascending (or descending) order, as shown in Step 360 to form Array T. As shown in Step 365, holder tmp is set to the first value in T (an observation number that contains a sensor minimum or maximum). Additionally, the first column of Array D is set to be equal to the column of Array X corresponding to the observation number that is the first element of T. In the loop starting with the decision box of Step 370, the $i^{th}$ element of T is compared to the value of tmp that contains the previous element of T. If they are equal (i.e., the corresponding observation vector is a minimum or maximum for more than one sensor), that vector has already been included in Array D and need not be included again. Counter i is then incremented, as shown in Step 375. If the comparison is not equal, Array D is updated to include the column from X that corresponds to the observation number of T(i), as shown in Step 380, and tmp is updated with the value at T(i). Counter j is then incremented, as shown in Step 385, in addition to counter i (Step 375). In Step 390, if all the elements of T have been checked, and counter i equals twice the number of elements, N, then the distillation into training set or Array D has finished.

As described above, signal data may be gathered from any machine, process or living system that is monitored with sensors. Ideally, the number of sensors used is not a limiting factor, generally, other than concerning computational overhead. Moreover, the methods described herein are highly scalable. However, the sensors should capture at least some of the primary "drivers" of the underlying system. Furthermore, all sensors inputted to the underlying system should be interrelated in some fashion (i.e., non-linear or linear).

Preferably, the signal data appear as vectors, with as many elements as there are sensors. A given vector represents a "snapshot" of the underlying system at a particular moment in time. Additional processing may be done if it is necessary to insert a "delay" between the cause and effect nature of consecutive sensors. That is, if sensor A detects a change that will be monitored by sensor B three "snapshots" later, the vectors can be reorganized such that a given snapshot contains a reading for sensor A at a first moment, and a reading for sensor B three moments later.

Further, each snapshot can be thought of as a "state" of the underlying system. Thus, collections of such snapshots preferably represent a plurality of states of the system. As described above, any previously collected sensor data is filtered to produce a "training" subset (the reference set D) that characterizes all states that the system takes on while operating "normally" or "acceptably" or "preferably." This training set forms a matrix, having as many rows as there are sensors of interest, and as many columns (snapshots) as necessary to capture the acceptable states without redundancy.

The similarity engine of the present invention allows for the computation of an expected "snapshot" given the real-time actual "snapshot" of the operation of the underlying system. That is, once the matrix reference D has been determined in a training and implementation phase, the similarity engine is activated, and, through time, actual snapshots of real sensor values are input to the similarity engine. The output of the similarity engine can be similarity values, expected values, or a "residual" value (e.g., the difference between the actual and expected values).

The output of the similarity engine may then be fed to a statistical significance engine, which then determines, through a series of such snapshots, whether a statistically significant change has occurred. In other words, the statistical significance engine effectively determines if the real values of the snapshots represent a significant change from the "acceptable" values stored in the D matrix.

Thus, in accordance with the present invention, a process or machine may be monitored for process upsets, sensor failures and other impending faults, using an empirical model of the process or machine generated from sensor data gathered while the process or machine is operating in a satisfactory state. The empirical model employs the improved similarity operator of the present invention, in conjunction with a training set or reference library distilled from the gathered normal operating data. The empirical model then generates an estimate for the sensor values for the process or machine in response to received inputs of the current actual sensor data of the process or machine. These estimates are then compared to the actual sensor data in a sensitive statistical test. This statistical test accordingly provides indications of impending faults.

The actual similarity operator has been improved in the present invention to provide a continuous similarity function at sensor values outside of the ranges stored within the reference library. In the present invention, the similarity operator defines the elemental similarity, $s_c$, between $c^{th}$ elements Y(c) and R(C) of two snapshots Y and R, respectively, as:

$$s_c = \left(1 + \left(\frac{\theta_c^\lambda}{\rho}\right)\right)^{-1} \quad (4)$$

where $\theta_c$ is a function of the elements Y(c) and R(c), $\lambda$ and $\rho$ are sensitivity constants that can be selected for optimization. The function $\theta$ preferably returns a zero when the elements Y(c) and R(c) are equal or identical, and preferably returns an increasingly large positive number with increasing difference of the two elements, with no limit. $\lambda$ and $\rho$ can be selected as any positive constants, and preferably are selected in the range of one to four.

$\theta$ can be selected from a variety of functions according to the invention. Importantly, $\theta$ preferably scales the sameness or difference of two corresponding elements by the range observed over the reference library for the sensor corresponding to the two elements. By way of example, $\theta$ can be defined as follows:

$$\theta_c = \frac{\max(Y_c, R_c) - \min(Y_c, R_c)}{(\text{Max}_{range} - \text{Min}_{range})} \quad (5)$$

where:

$\text{Max}_{range}$ is the maximum value of the sensor corresponding to the $c^{th}$ element across all snapshots in the reference library D;

$\text{Min}_{range}$ is the minimum value of that sensor in the same manner;

$Y_c$ represents the $c^{th}$ component of the snapshot Y (typically the current live snapshot of the process or machine, but also can be a row or column from a matrix of snapshots);

$R_c$ represents the $c^{th}$ component of the snapshot R (typically a column of the reference library D, but can also be a vector or snapshot from any matrix of snapshots);

Accordingly, this version of the function theta returns zero when Y(c) and R(c) are identical values. As Y(c) and R(c) are increasingly different, theta becomes increasingly positive. Finally, the difference between Y(c) and R(c) is scaled to the overall range expected for the related sensor, which also eliminates the arbitrary effect of units chosen to measure the sensor value.

Figure 6:
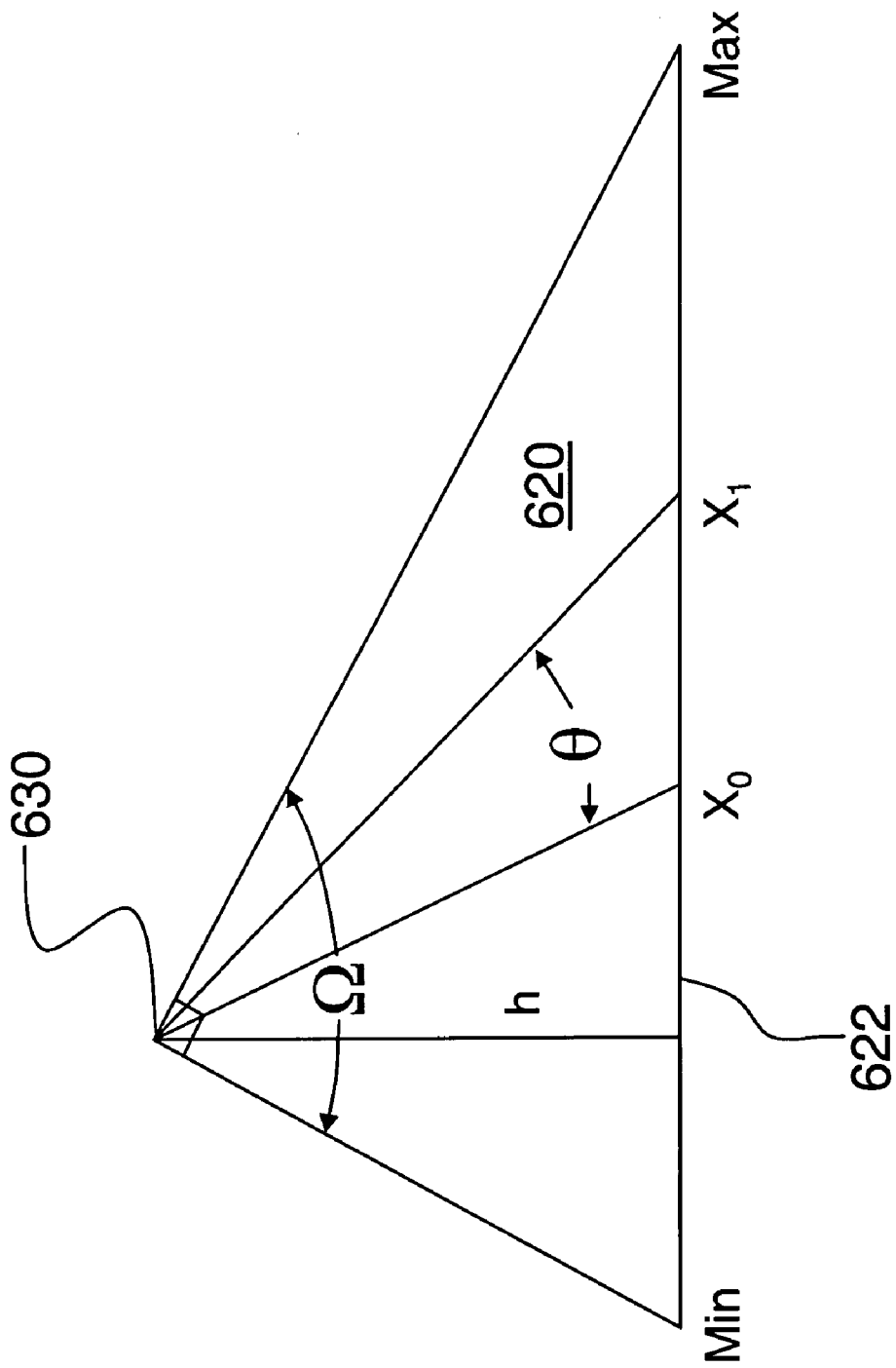
FIG. 6 illustrates a similarity operator of the prior art that may be used in part in the present invention.

The BART operator of Wegerich has a θ function, shown in FIG. 6 of the present invention, which may be employed in the improved similarity operator of the present invention. Therein is described the formation of a triangle 620, preferably with a right angle, which forms a "similarity domain" 622 equated to the range expected for a sensor, over all the snapshots in the reference library. Two elements being compared for similarity are mapped onto that domain, and the angle, θ, formed by those points drawn to the apex right angle 630 is compared to the right angle, Ω, itself as a measure of theta:

$$\theta = \frac{\text{ArcTan}\left(\frac{X_1}{h}\right) - \text{ArcTan}\left(\frac{X_0}{h}\right)}{\left(\frac{\pi}{2}\right)} \quad (6)$$

where h is the height of the formed right triangle, $X_1$ is the larger of the two elements, and $X_0$ is the smaller of the two elements.

Other versions of θ may be used with the similarity operator of the present invention. Preferably, such θ functions return zero for identical elements from two vectors, and return increasingly larger positive numbers for increasing differences of elements.

Turning back to Equation 4 above, the elemental similarity is computed based on the function θ. If λ and ρ are both chosen to be one, then if θ returns a zero for elements that are identical, the similarity will be one. If the elements are quite dissimilar, theta will be a large number, and the elemental similarity will be very small. With increasing θ, the elemental similarity approaches zero. Advantageously, the elemental similarity is never negative, as can happen with out-of-range data using some prior art similarity operators.

Elemental similarities are calculated for each corresponding pairs of elements of the two snapshots being compared. Then, the elemental similarities are combined in some statistical fashion to generate a single similarity scalar value for the vector-to-vector comparison. Preferably, this overall similarity, S, of two snapshots is equal to the average of the number N (the element count) of $s_c$ values:

$$S = \frac{\sum_{c=1}^{N} S_c}{N} \quad (7)$$

An alternative way to compute the overall vector-to-vector similarity is to first average the θ values across all elements, and use the average θ to compute the similarity as in equation 4:

$$S = (1 + \frac{\left(\sum_{c=1}^{N} \theta_c / N\right)^\lambda}{\rho})^{-1} \quad (8)$$

Equations 1, 2 and 3 show how to calculate the estimated set of expected sensor values for the monitored process or machine, in response to the current actual sensor values. The similarity operation therein is detailed in the above equations 4 through 8, where two alternative examples of theta are shown in equations 5 and 6, and two alternative ways of computing snapshot similarity are provided in equations 7 and 8. This exercise is explicitly laid out below.

The operator in use within the present invention, having been described generically above, works as follows in the determination of W. The first factor, $D^T \otimes D$, is commonly identified as matrix G:

$$\overline{G} = \overline{D}^T \odot D \quad (9)$$

Thus, for D and $D^T$ having four sensors on the monitored process or machine, a, b, c and d and for n training set snapshots:

$$\overline{D}^T = \begin{bmatrix} a_1 & b_1 & c_1 & d_1 \\ a_2 & b_2 & c_2 & d_2 \\ \vdots & \vdots & \vdots & \vdots \\ a_n & b_n & c_n & d_n \end{bmatrix} \quad \overline{D} = \begin{bmatrix} a_1 & a_2 & \cdots & a_n \\ b_1 & b_2 & \cdots & b_n \\ c_1 & c_2 & \cdots & c_n \\ d_1 & d_2 & \cdots & d_n \end{bmatrix} \quad (10)$$

then the matrix G is:

$$\overline{G} = \begin{bmatrix} g_{11} & g_{12} & \cdots & g_{1n} \\ g_{21} & g_{22} & \cdots & g_{2n} \\ \vdots & \vdots & \vdots & \vdots \\ g_{n1} & g_{n2} & \cdots & g_{nn} \end{bmatrix} \quad (11)$$

where, for example, the element $g_{12}$ in the matrix G is computed from Row one of $D^T$ ($a_1$, $b_1$, $c_1$, $d_1$) and Column two of D ($a_2$, $b_2$, $c_2$, $d_2$) using Equation 7 as:

$$S_{12} = \frac{\sum_{i=a,b,c,d} s_i}{4} \quad (12)$$

where the elemental similarities $s_i$ are computed from Equation 4. By way of example, if Equation 5 is used to compute $\theta_i$ then:

$$\theta_a = \frac{\max(a_1, a_2) - \min(a_1, a_2)}{(\text{Max}_a - \text{Min}_a)} \quad (13)$$

$$\theta_b = \frac{\max(b_1, b_2) - \min(b_1, b_2)}{(\text{Max}_b - \text{Min}_b)} \quad (14)$$

$$\theta_c = \frac{\max(c_1, c_2) - \min(c_1, c_2)}{(\text{Max}_c - \text{Min}_c)} \quad (15)$$

-continued $$\theta_d = \frac{\max(d_1, d_2) - \min(d_1, d_2)}{(\text{Max}_d - \text{Min}_d)} \quad (16)$$

Selecting $\lambda$ and $\rho$ both to be equal to 2, the elemental similarities would then be:

$$s_i = \left(1 + \frac{\theta_i^2}{2}\right)^{-1} \quad (17)$$

However, it should be noted that $\lambda$ and $\rho$ can be selected to be different from each other, and furthermore, can be selected to be different for each sensor. Thus for sensor A, they might both be one, but for sensor B, $\lambda$ may be 2 and $\rho$ may be 3.5.

The resultant matrix G is symmetric around the diagonal, with ones on the diagonal. Therefore, to further calculate W, the computation of $D^T \otimes Y_{input}$, in Equation 3, above, is performed in a similar fashion, except $Y_{input}$ is a vector, not a matrix:

$$\overline{D}^T \otimes \vec{Y}_{input} = \begin{bmatrix} a_1 & b_1 & c_1 & d_1 \\ a_2 & b_2 & c_2 & d_2 \\ \vdots & \vdots & \vdots & \vdots \\ a_n & b_n & c_n & d_n \end{bmatrix} \otimes \begin{bmatrix} a_{in} \\ b_{in} \\ c_{in} \\ d_{in} \end{bmatrix} = \begin{bmatrix} S_1 \\ S_2 \\ \vdots \\ S_n \end{bmatrix} \quad (18)$$

The G matrix is then inverted using standard matrix inversion, and the result is multiplied by the result of $D^T \otimes Y_{input}$. The result is W, as shown:

$$\hat{\underline{W}} = \overline{G}^{-1} \cdot \begin{bmatrix} S_1 \\ S_2 \\ \vdots \\ S_n \end{bmatrix} = \begin{bmatrix} W_1 \\ W_2 \\ \vdots \\ W_n \end{bmatrix} \quad (19)$$

Turning to the parameters $\lambda$ and $\rho$, either value can of course be set to one. The constant, $\rho$, can be chosen from all values greater than or equal to one. Moreover, the value, $\lambda$, can be chosen as any positive value.

The computation of the expected values for the sensors may be subtracted from the actual sensor values to provide a "residual." The residual snapshot is also a vector having the same number of elements as the sensor-count, with each element indicating how different the actual value is from the estimated value for that sensor.

A statistical significance test can be applied to the elements of the residual, or to the residual as a whole. More particularly, a test known as the sequential probability ratio test (SPRT) is applied to the residual for each sensor. This provides a means for producing an alarm or other indicator of statistically significant change for every sensor in real-time. The application of SPRT to the residual is described in Gross, recited above.

Figure 4:
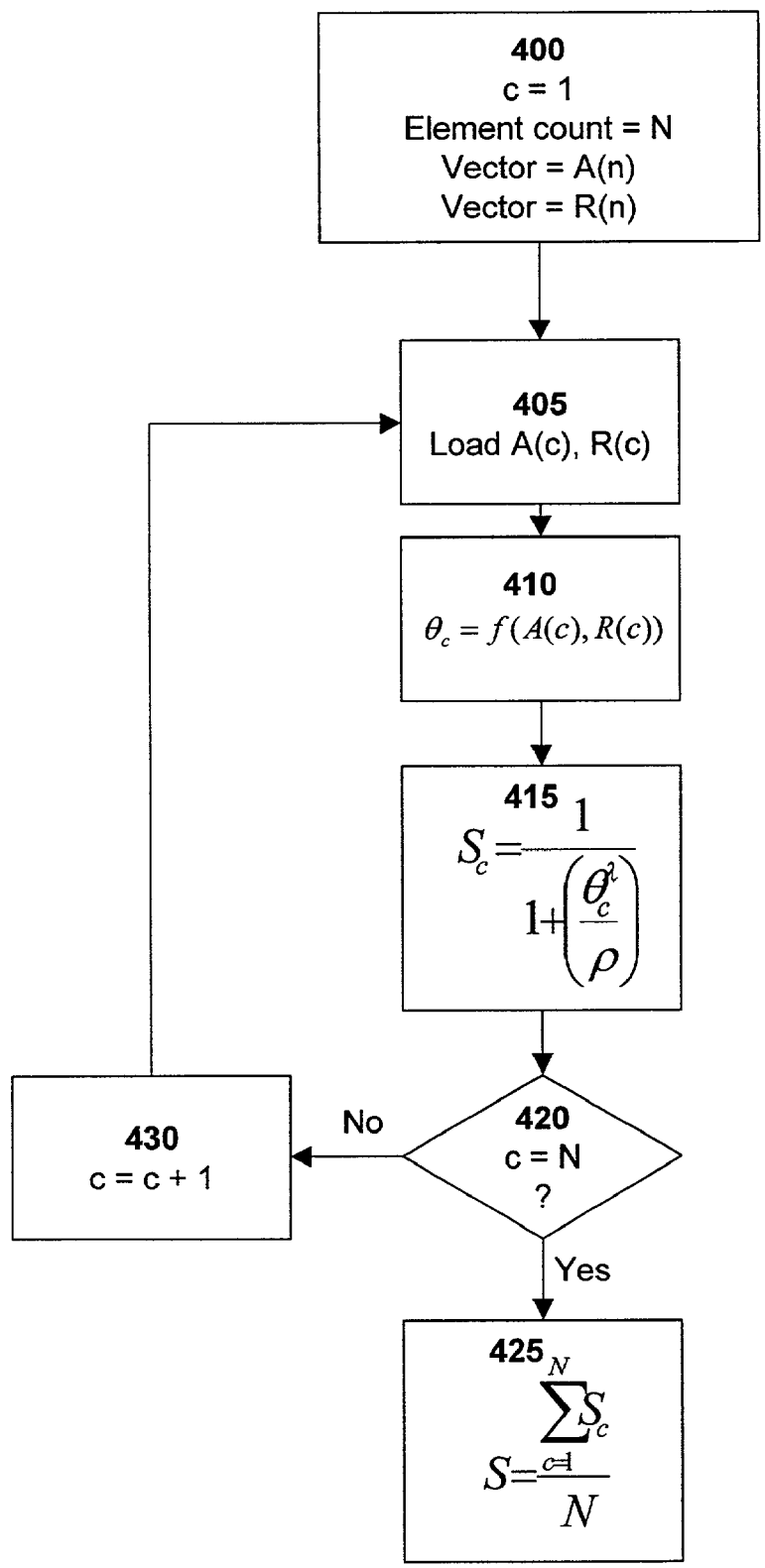
FIG. 4 illustrates a flowchart of a method for calculating a snapshot similarity value, in accordance with the present invention.

FIG. 4 illustrates a flowchart depicting one embodiment, in accordance with the present invention, of a method and system for the calculation of the similarity value, S, using the similarity operator, $\otimes$, for two state vectors, A(n) and R(n). Preferably, each state vector comprises various elements that can be, for example, contemporaneous or time-correlated sensor data from a number of sensors used in monitoring a process or machine, as described above. For example, the vectors may correspond to vibration measurements, temperature measurements, rate measurements, frequency measurements or any other measurements to which the present invention may be applied. Moreover, one, several or all of the elements may be derived variables (e.g., quality determinations), statistical values (e.g., dropped network packets per hour) or even discrete variables taking on one of several discrete values. Again, the nature of the elements depends on the type of system, process or machine to which the present invention is applied. Preferably, each state vector, A(n) and R(n), has the same number of elements, N. Furthermore, the order of the elements should correspond in both state vectors, so that if, for example, the third element A(3) of state vector A(n) is a pressure reading from a particular pressure sensor at the time represented by A, then the third element R(3) of state vector R(n) should also be a pressure reading from the same pressure sensor on the monitored system or a like system at a different time represented by R.

In Step 400, the calculation parameters are shown as being initialized. Preferably, the initializations include a counter, c, for use in counting through the N elements of the two state vectors. In Step 405, the $c^{th}$ elements of state vectors A(n) and R(n) are loaded for processing. In Step 410, the value of the $\theta$ function is calculated. Preferably, the $\theta$ function is based on the $c^{th}$ elements of state vectors A(n) and R(n). According to one embodiment of the present invention, $\theta$ may be chosen from a variety of functions. Importantly, however, the $\theta$ function preferably approaches a value of zero as the $c^{th}$ elements of state vectors A(n) and R(n) become more identical. Therefore, the $\theta$ function preferably equals zero at the point at which the $c^{th}$ elements are identical. Suitable functions for the $\theta$ function are described herein. One appropriate function according to Equation 5 above is the difference between the maximum of the $c^{th}$ elements and the minimum of the $c^{th}$ elements, divided by a scaling factor indicative of the expected range for the sensor or variable that corresponds to these elements. As a result, as the $c^{th}$ elements approach the same value, the $\theta$ function approaches zero.

As shown in Step 415, the value of $\theta$ for the $c^{th}$ elements of state vectors A(n) and R(n) is then used to compute the similarity value, $S_c$, of the $c^{th}$ elements of state vectors A(n) and R(n). Preferably, this computation is done according to the formula and methodology shown therein. Generally, according to one embodiment of the present invention, the similarity value, $S_c$, is set equal to the inverse of a quantity that includes the $\theta$ value as one of its terms. As shown in the preferred embodiment of the present invention depicted in Step 415, as $\theta$ approaches zero (which occurs for the increasing sameness of the elements), the similarity value, $S_c$, approaches one. Thus, when the elements are indeed identical, the similarity value should be one. When the elements are substantially dissimilar, $\theta$ grows to a large (and preferably positive) value, and the similarity value, $S_c$, falls well below one, and can actually approach zero. Thus, advantageously, $\theta$ can grow in an unlimited fashion for elements that are more dissimilar than even the expected range for that sensor, and thereby accommodate new sensor readings outside the range, which before have never been encountered and modeled.

For example, if a temperature sensor has an expected range of 100-112° F., and A(temp) and R(temp) are 145 and 102° F., respectively, defining $\theta$ as described above yields a value of 43 divided by the range of 12, or approximately 3.58. Using this value in Step 415, and setting the user-selectable constants λ and ρ both equal to one, the similarity value, $S_c$, becomes equal to $(1+3.58)^{-1}$, or approximately 0.22. Using other similarity operators known in the art, data values such as these lying outside the expected range are customarily set to a similarity of zero automatically (in some cases because if this were not done, the resulting similarity would be negative). In those prior art similarity operators, continuity of the similarity function is lost, as well as valuable quantifiable dissimilarity information regarding the data elements.

As shown in Step 420, if the counter, c, is equal to the total number of elements, N, then the overall similarity value, S, of the vector-to-vector comparison is computed in Step 425 by averaging the similarities obtained for each element-to-element comparison, $S_c$. If c is not yet equal to N, c is then incremented by one, as shown in Step 430, and the next element from each vector is loaded, as shown in Step 405 for computation of the next similarity value, $S_c$.

Figure 5:
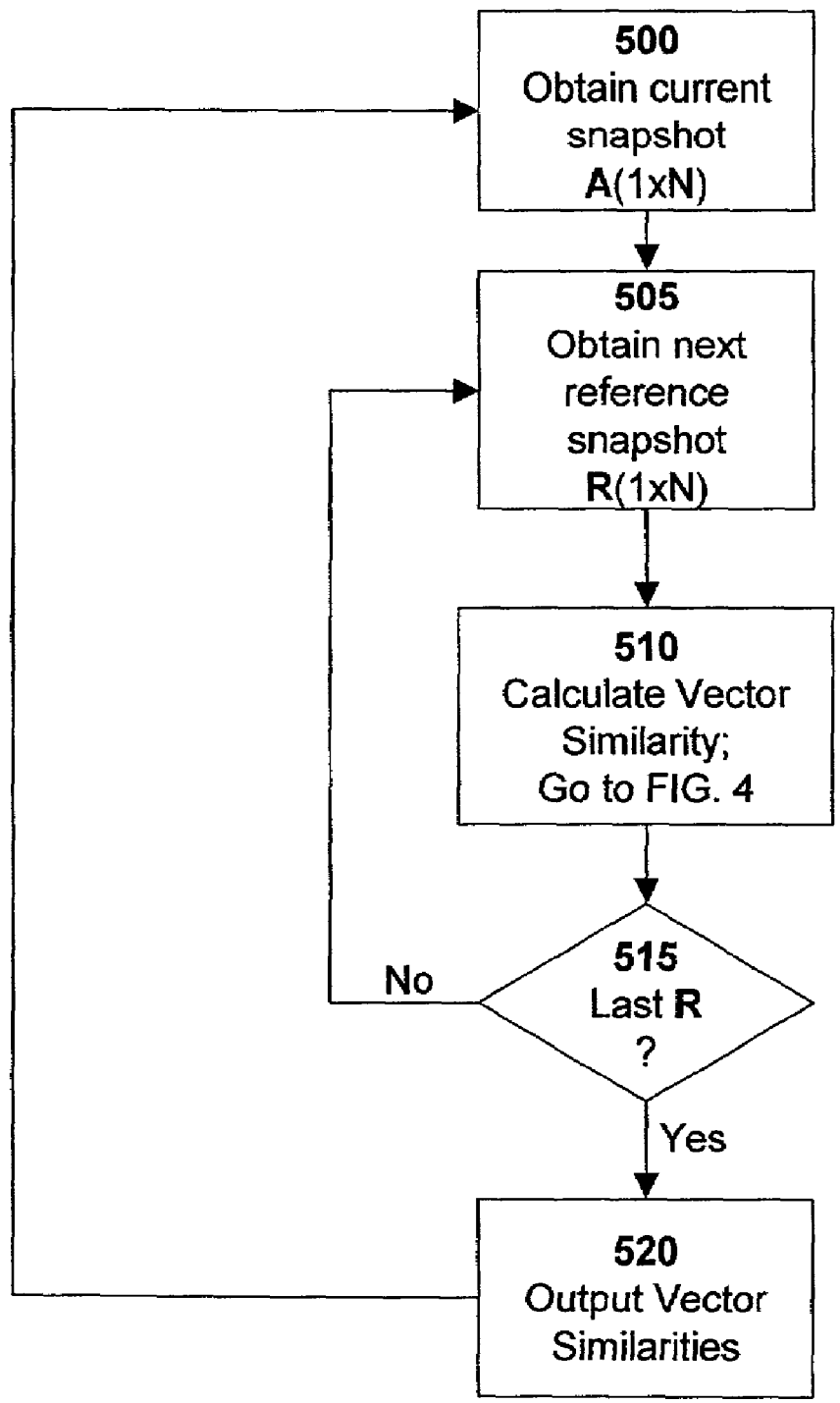
FIG. 5 illustrates a flowchart further detailing continuous state estimation for a monitored process or machine using snapshot similarity values from FIG. 4.

As shown in FIG. 5, the steps of FIG. 4 are further depicted in Step 510, illustrating how the vector-to-vector similarity calculation of FIG. 4 fits in to the empirical modeling and estimation using a current snapshot or state vector A(n) and a reference library comprising a plurality of snapshots, R, selected to represent the normal, acceptable or desirable operation of the process of machine being monitored with a monitoring system of the present invention.

Accordingly, referring to FIG. 5, as shown in Step 500, the current snapshot A is obtained from the process or machine being monitored. Preferably, this data may be sent directly to the processor or computer on which the software of the present invention is operating, by means of a data acquisition card or similar device. Alternatively, the information of vector A may be polled from a data historian or process control database for a monitored process. In yet another alternative, the data may be presented to the software of the present invention as a datagram or message received in a Local Area Network (LAN) or Wide Area Network (WAN) environment, such as an asynchronous message received over the Internet from a remote process or machine equipped to serve its sensor data to Internet clients.

As shown in Step 505, a snapshot, R, is selected from the reference library of snapshots. The reference library can be a database of stored data local to the processor, or can also be data loaded from a remote location. In most cases, the reference library, or a derivation thereof, will be sufficiently small to be stored in dynamic memory, as is desirable for computational efficiency. As shown in Step 510, the steps of FIG. 4 are executed to compute the vector-to-vector similarity of the current snapshot to the selected reference library snapshot.

Next, as shown in Step 515, if there are more snapshots in reference library, R, to process against the current snapshot A, then processing preferably proceeds to Step 505, where the next snapshot or state vector in R is loaded. If all the vectors in reference library snapshot, R, have been processed against the state vector A, then the vector similarities are output to subsequent processing, as shown in Step 520. For continuous real-time monitoring of a process or machine, the process returns to Step 500, and the next current snapshot A is then obtained.

It can be observed that the reference library is effectively the aforementioned matrix, D, with individual snapshots making up the rows or columns, and the input vector Y is A.

Figure 7:
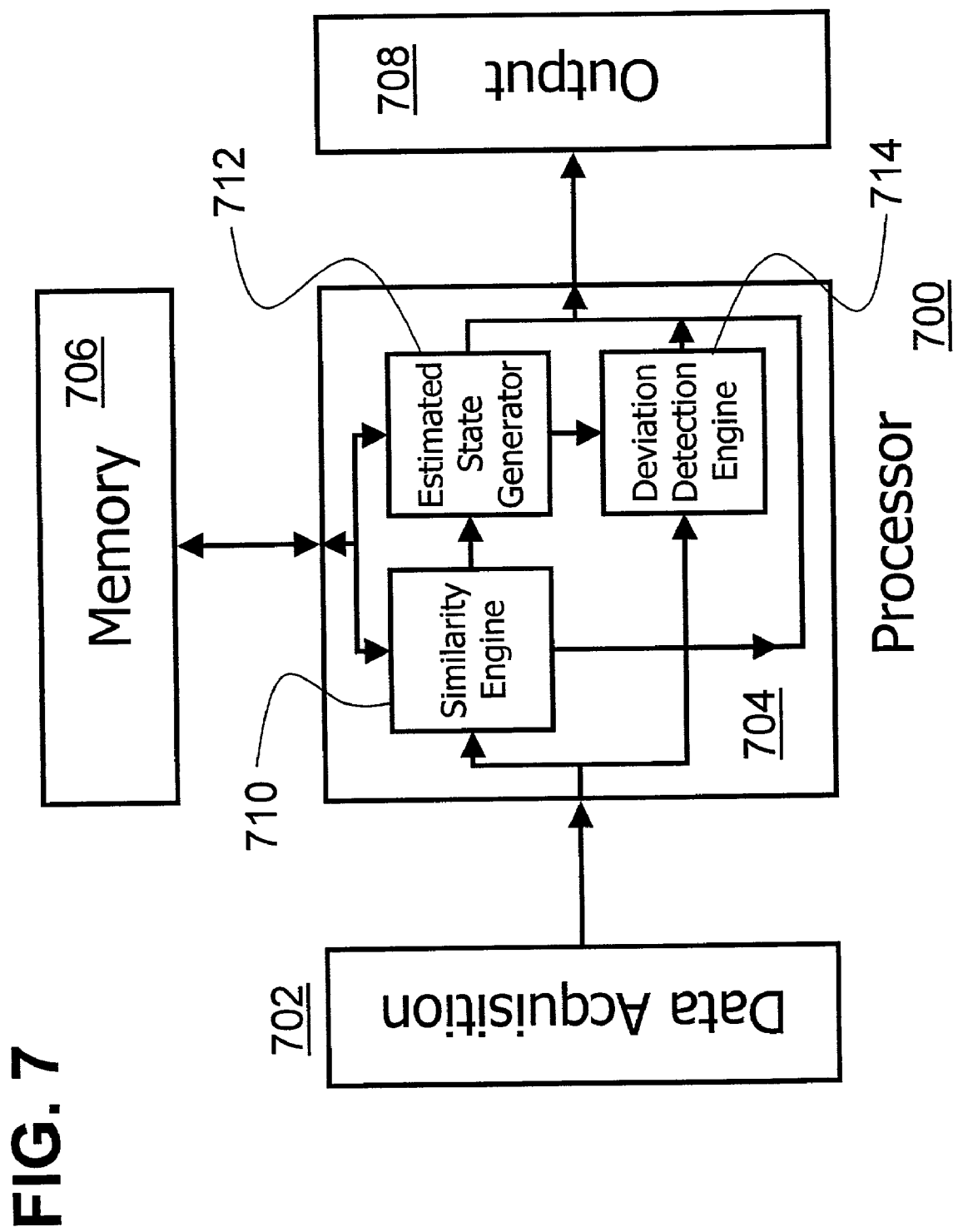
FIG. 7 illustrates a hardware embodiment of the present invention.

Turning to FIG. 7, a preferred embodiment of an apparatus utilizing the present invention is deployed as an electrically-powered device 700 that can be located on a monitored piece of equipment. Preferably, this electrically-powered device includes a memory location 706 and a processor 704. A data acquisition module 702 is connected to sensors on the machine being monitored. An output module 708 provides monitoring indications to a human observer, to downstream processing, or to a control or feedback system. The processor 704 comprises a similarity engine 710, an estimated state generator 712 and a deviation detection engine 714. A reference library such as matrix D or a precomputed matrix G is stored in memory 706. In response to receiving real-time data from the sensors via data acquisition module 702, in the form of a time-correlated (in most cases simultaneous) observation snapshot, the similarity engine 710 computes the similarities of the current snapshot to the snapshots stored in the memory 706, equivalent to carrying out Equation 18. These similarities can be provided directly to output module 708, for use in diagnostics, classification, and the like. For example, if the classification of the snapshots comprising the reference library is known, a classification of the current real-time snapshot (and therefore the state of the monitored system) can be determined by selecting the class of the reference library snapshot that bears the highest overall similarity to the current real-time snapshot. They are also provided to estimated state generator 712, which computes an estimated state vector in response thereto, according to Equation 1. The estimated state vector is provided to deviation detection engine 714, which also is disposed to receive the current real-time snapshot directly from data acquisition module 702, to compute a residual and run a statistical test against a sequence of such residuals, such as a sequential probability ratio test. The result of this test shows for each sensor whether the sensor is different or the same as what is expected, based on the aggregate view of all the sensor inputs to the model. Deviations are indicative of process upset, incipient machine failure, or sensor failure.

Moreover, the device shown in FIG. 7 may be physically located at or near the process or machine on which monitoring is performed. Alternatively, the device may be located remotely from the process or machine, such as, for example, in a module in a personal computer, or similar electronic system, which receives sensor data from a preferred plurality of live sensors disposed on the process or machine via an electronic network or wireless transmission facility. The sensor signals generated accordingly may then be returned to a control system or display system local to the process or machine, or located at a remote location or yet a different remote location from the processor or machine.

It should be appreciated that the embodiments described above are to be considered in all respects only illustrative and not restrictive. For example:

A different θ function can be used for each sensor;

θ can be added to a constant other than one, before inverting to provide the similarity; and θ can be a function that approaches zero as the elements approach identity.

The scope of the present invention is indicated by the following claims rather than by the foregoing description. All changes that come within the meaning and range of equivalents are to be embraced within their scope.

We claim:

1. A computable program product for computing similarity values for monitoring states of operation of a system, comprising a computer readable medium having instructions thereon which cause a processor to execute a process for:

selecting a next state vector from a reference library of state vectors comprising elemental parameter values from a memory;

retrieving a monitored state vector comprising elemental parameter values from an input source;

computing a difference function for pairs of corresponding elemental parameter values for a parameter of said system selected from the next state vector and the monitored state vector;

computing an elemental similarity $s_c$ for pairs of corresponding elements, according to:

$$s_c = \left(1 + \left(\frac{\theta_c^\lambda}{\rho}\right)\right)^{-1}$$

for a corresponding pair of elements c where theta is the difference function, and lambda and rho are selectable constants;

combining elemental similarities for all pairs of corresponding elements to provide a vector similarity of the next state vector and the monitored state vector; and storing in computer memory said vector similarity for use in providing information regarding states of operation of said system.

2. The computable program product of claim 1, wherein said instructions further cause a processor to execute a process for generating and storing in computer memory an estimated state vector from a composite of reference library state vectors using vector similarities of each state vector to the monitored state vector, said estimated state vector forming a basis for providing information regarding the states of operation of said system.

3. The computable program product of claim 1, wherein said instructions further cause a processor to execute a process for determining a highest vector similarity among vector similarities of each state vector in the reference library to the monitored state vector, and selecting and storing in computer memory a classification associated with the reference state vector having the highest vector similarity, said classification forming a basis for providing information regarding the states of operation of said system.

4. The computable program product of claim 1, wherein said instructions for causing a processor to execute a process for combining elemental similarities for all pairs of corresponding elements to provide a vector similarity of the next state vector and the monitored state vector, compute the vector similarity $S_v$ as:

$$S_V = \frac{1}{N} \sum_{c=1}^{N} \left(1 + \left(\frac{|Y_c - R_c|}{\rho_c}\right)\right)^{-1}$$

for monitored state vector Y and next state vector R, each having at least N elements, where $Y_c$ and $R_c$ are the $C^{th}$ elements of Y and R respectively, and rho-sub-c ($\rho_c$) is an expected range for the $C^{th}$ elements.

5. A method for empirically modeling multiple parameters of a system, wherein said system is selected from a process, a machine or a biological system, the empirical model used to analyze said system, said method comprising:

providing a reference library of snapshots of time-related values of said parameters representing operation of said system;

providing a monitored snapshot of values of at least some of said parameters;

computing for the at least some parameters values of a difference function of corresponding parameters of said monitored snapshot and said reference library snapshots;

computing for the at least some parameters elemental similarities of corresponding parameters of said monitored snapshot and a reference library snapshot as the inverse of: a constant plus the value of the difference function, computing a snapshot similarity from the elemental similarities of corresponding parameters of the monitored snapshot and a reference library snapshot, and storing in a computer memory at least one said snapshot similarity for use in an analysis of said system.

6. The method of claim 5, further comprising the step of generating and storing in a computer memory an estimate snapshot of said parameters based on at least one snapshot similarity and using said estimate snapshot in said analysis.

7. The method of claim 6, further comprising the step of comparing the estimate snapshot to the monitored snapshot and generating and storing in a computer memory an alert on determining a difference.

8. The method of claim 5, further comprising:

providing a classification associated with at least some of the reference library snapshots; and determining and storing in a computer memory a classification for said monitored snapshot based on at least one snapshot similarity and the reference library snapshot classifications.

9. The method of claim 8, wherein said determining step comprises determining the class of the reference library snapshot having the highest snapshot similarity with said monitored snapshot.

10. The method of claim 5, wherein said difference function is a function of the larger of two corresponding parameters minus the smaller of the two corresponding parameters, divided by an expected range for such parameters.

11. The method of claim 10, wherein said snapshot similarity ($S_v$) is computed according to:

$$S_V = \frac{1}{N} \sum_{c=1}^{N} \left(1 + \left(\frac{|Y_c - R_c|}{\rho_c}\right)\right)^{-1}$$

for monitored snapshot Y and reference library snapshot R, each having at least N corresponding parameters, where $Y_c$ and $R_c$ are the $C^{th}$ parameters of Y and R respectively, and rho-sub-c ($\rho_c$) is an expected range for the $C^{th}$ parameters.

12. The method of claim 5, wherein said difference function is a function of the difference between a trigonometric function of the first of two corresponding parameters and a trigonometric function of the second of the two corresponding parameters.

13. An apparatus for monitoring the state of a system instrumented with sensors, wherein said system is selected from a process or a machine, said apparatus comprising:

a memory for storing a reference library of snapshots of time-related values of said sensors representing operation of said system;

means for acquiring a monitored snapshot of sensor values from the system;

a similarity module implemented in software and executed in a processor that receives the monitored snapshot from said means for acquiring and generates similarity values for comparisons of the monitored snapshot to reference library snapshots in said memory, for providing an indication of the state of the system based on the similarity values; and output means that stores in a computer memory a system state based on the similarity values;

where each similarity value for a comparison of the monitored snapshot to a reference library snapshot is a statistical composite of similarity values for corresponding elements of the monitored snapshot and the reference library snapshot, wherein each similarity value for corresponding elements is derived from the inverse of a quantity comprising a constant plus a difference of the corresponding elements, said difference divided by an expected range for said elements.

14. The apparatus of claim 13, further comprising an estimated state generator implemented in software and executed in a processor, that generates a snapshot of estimated sensor values, based on the generated similarity values, said estimated sensor values forming a basis for indicating the state of said system.

15. The apparatus of claim 14, wherein the estimated state generator generates the estimated sensor values as a composite of the reference library snapshots, weighted by corresponding similarity values from said similarity module.

16. The apparatus of claim 14, further comprising a deviation detection module implemented in software and executed in a processor, that receives the estimated sensor values from said estimated state generator and the monitored snapshot, and generates an indication of a difference between them, as a basis for indicating the state of said system.

17. The apparatus of claim 16, wherein the deviation detection module differences the estimated sensor values with the monitored snapshot to produce a residual snapshot, and performs a sequential probability ratio test on at least one sensor across a sequence of such residual snapshots, as a basis for indicating the state of said system.

18. The apparatus of claim 13, wherein said output means stores in a computer memory a classification associated with at least one reference library snapshot, based on which reference library snapshot has the highest similarity value with the monitored snapshot.

19. The apparatus of claim 13, wherein the statistical composite of similarity values for corresponding elements of the monitored snapshot and the reference library snapshot is calculated according to:

$$S = \frac{\sum_{c=1}^{N} S_c}{N}$$

where $s_c$ is the similarity value for corresponding elements c of snapshots comprising N elements.

20. The apparatus of claim 13, wherein said difference of the corresponding elements is equal to the absolute value of the difference of the corresponding elements.

21. The apparatus of claim 13, wherein said difference of the corresponding elements is equal to the difference of a trigonometric function of each of the corresponding elements individually.

* * * * *

UNITED STATES PATENT AND TRADEMARK OFFICE
CERTIFICATE OF CORRECTION

PATENT NO.         : 7,373,283 B2
APPLICATION NO. : 09/791046
DATED                 : May 13, 2008
INVENTOR(S)        : James P. Herzog et al.

It is certified that error appears in the above-identified patent and that said Letters Patent is hereby corrected as shown below:

In Claim 4, Column 15, Line 58, delete "$C^{th}$" and insert -- $c^{th}$ --, therefor.

In Claim 4, Column 15, Line 60, delete "$C^{th}$" and insert -- $c^{th}$ --, therefor.

In Claim 11, Column 16, Line 52, delete "$C^{th}$" and insert -- $c^{th}$ --, therefor.

In Claim 11, Column 16, Line 54, delete "$C^{th}$" and insert -- $c^{th}$ --, therefor.

Signed and Sealed this

Twelfth Day of August, 2008

JON W. DUDAS
*Director of the United States Patent and Trademark Office*